(12) United States Patent
Porter et al.

(10) Patent No.: US 7,227,900 B2
(45) Date of Patent: Jun. 5, 2007

(54) DIFFERENTIAL ENCODING

(75) Inventors: Robert Mark Stefan Porter, Winchester (GB); Nicholas Ian Saunders, Basingstoke (GB); Jason Charles Pelly, Reading (GB)

(73) Assignee: Sony United Kingdom Limited, Weybridge (GB)

( * ) Notice: Subject to any disclaimer, the term of this patent is extended or adjusted under 35 U.S.C. 154(b) by 713 days.

(21) Appl. No.: 10/400,808

(22) Filed: Mar. 27, 2003

(65) Prior Publication Data

US 2004/0008781 A1 Jan. 15, 2004

(30) Foreign Application Priority Data

Mar. 28, 2002 (GB) .................................. 0207421.9

(51) Int. Cl.
*H04N 7/12* (2006.01)
(52) U.S. Cl. ............................ 375/240.27; 375/240.24
(58) Field of Classification Search ........... 375/240.16, 375/270.27, 243, 240.27, 240.24; 382/232; 348/699, 410.1
See application file for complete search history.

(56) References Cited

U.S. PATENT DOCUMENTS

| 5,598,216 A | * | 1/1997 | Lee | 375/240.16 |
| 5,612,743 A | * | 3/1997 | Lee | 375/240.16 |
| 5,668,608 A | * | 9/1997 | Lee | 348/699 |
| 6,014,463 A | * | 1/2000 | Hirabayashi | 382/232 |

FOREIGN PATENT DOCUMENTS

| EP | 0 644 697 | 3/1995 |
| EP | 1 033 885 | 9/2000 |
| WO | WO 02 07448 | 1/2002 |

OTHER PUBLICATIONS

Netravali A N et al: "Picture Coding: A Review" Proceedings of the IEEE, IEEE. New York, US, vol. 68, No. 3, Mar. 1, 1980, pp. 366-407, XP002028499 ISSN: 0018-9219.

* cited by examiner

*Primary Examiner*—Gims Philippe
(74) *Attorney, Agent, or Firm*—Oblon, Spivak, McClelland, Maier & Neustadt, P.C.

(57) ABSTRACT

An encoding apparatus operable to encode video data representing successive images, each image including a plurality of pixels. The apparatus includes a differential encoder arranged to encode each image as one or more predetermined image regions. Each image is being encoded as a reference value and at least one differential pixel value. The differential pixel value(s) are derived in dependence on the reference value and/or other differential pixel value(s) in accordance with an order of encoding dependency; in which, for each image region, the differential encoder is operable in a first encoding mode for a first subset of the images to encode the image region using a first order of encoding dependency and in a second encoding mode for a second, different, subset of the images to encode the image region using a second, different, order of encoding dependency. The first and second subsets of images are arranged with respect to one another so that, from image to image, each image region is encoded in accordance with a predetermined sequence of orders of encoding dependency.

20 Claims, 13 Drawing Sheets

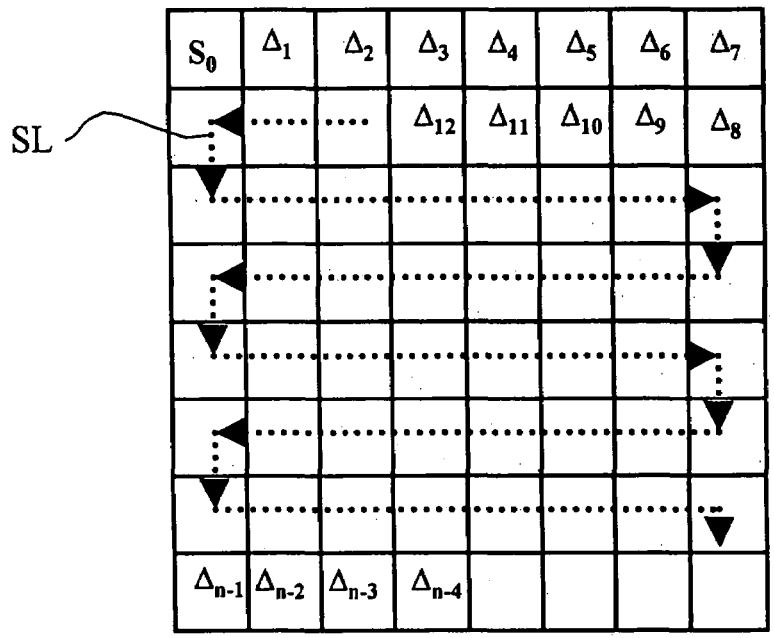
FIG. 2A
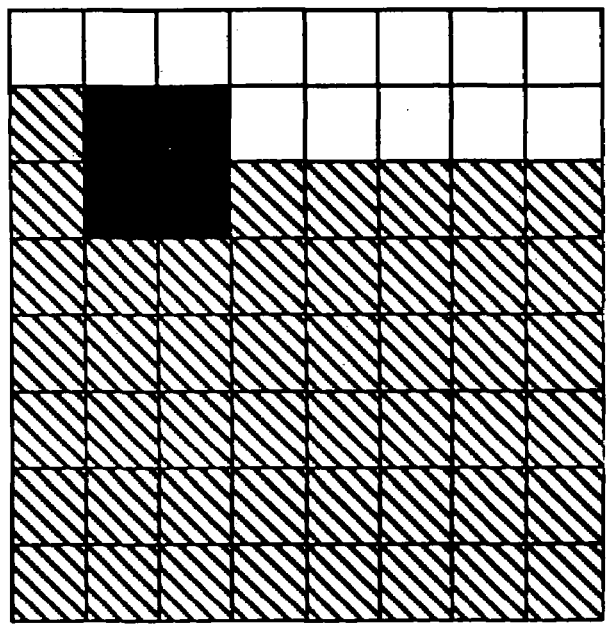
FIG. 2B
 DECODED PIXELS
 MISSING PIXEL DATA
 UNSUCCESSFULLY DECODED PIXELS

DIFFERENTIAL ENCODING

BACKGROUND OF THE INVENTION

1. Field of the Invention

This invention relates to differential encoding.

2. Description of the Prior Art

Differential encoding processes for encoding data such as Differential Pulse Code Modulation (DPCM) are well known and described for example in M. J. Riley and I. E. G. Richardson, "Digital Video Communications", Artech House Inc., 1997. Differential encoding processes are often used to encode image data but are applicable to any type of electronic data.

In one form of DPCM, a current pixel may be encoded either as a reference pixel value which is a direct representation of the pixel value, or as a differential pixel value. An image region may be represented by a reference pixel value and a group of one or more difference values. A difference value is determined from the reference pixel value and intermediate difference values, following an order of encoding dependency. Thus, an image region might have, for example, its top-left pixel encoded as a reference pixel value, and subsequent pixels as differential pixel values representing the difference between that pixel and a preceding pixel in an order of encoding dependency such as a raster scan pattern through the region.

DPCM can be improved by averaging the values of a neighbourhood of pixels in proximity to a current pixel. This may be further improved by using a weighting system, the weighting being dependent upon the proximity of a neighbouring pixel to the current pixel. The size of the neighbourhood can also be varied. Adaptive differential coding can also be implemented by modifying the algorithm used to calculate difference values. Such an algorithm can include calculations based on image statistics of a current image region or of a current image made up of image regions. DPCM can be operated in lossless mode as described above or in a lossy mode by quantising the DPCM encoded image regions.

In all of the above arrangements, it is a feature of DCPM that the decoding of difference values requires successful decoding of a reference pixel value and of other difference values. Generally, there is an order of encoding dependency associated with the difference values so that the operation to decode a difference value $\Delta_n$ requires the successful decoding of the reference pixel value and the intervening difference values $\Delta_1 \rightarrow \Delta_{n-1}$. In view of this, to avoid a small data error causing a large loss of decoded data, small image regions are generally encoded, for example an $8_H \times 8_V$ block.

Encoded image data is often stored on a storage medium such as magnetic tape or magnetic, optical or magneto-optical disc for off-line decoding and playback. In order for a user to gain an appreciation of the content of the image data, a useful function of playback devices is a shuttle mode in which the playback device is operable in such a way as to vary the speed and/or direction of playback.

A typical operation of shuttle mode would be to playback the video data at a multiple of the normal playback speed. In the case of a tape-based system, for example, such a shuttle operation may result in only data representing a subset of the image regions being successfully recovered from the tape. This results in lower quality playback in shuttle mode. However, full resolution playback is not strictly required for the user to gain an appreciation of the content of the image data stored on a tape.

Those image regions successfully recovered from the tape in shuttle mode may themselves lack a proportion of pixel representations. In an encoding process where data is represented spatially, those spatial locations lacking pixel representations are presented to an image output upon decoding as omitted pixel values for which no data is present. Thus shuttle mode playback quality is reduced as the proportion of omitted pixel representations in identified image regions increases. Concealment techniques have been proposed, for example, by replacing omitted pixel representations with values approximated from pixel representations in spatial proximity to the omitted pixel representation or with values approximated from those in adjacent images. However, such concealment techniques themselves rely on having other pixels nearby which have been successfully decoded. In particular, temporal concealment processes require pixels at substantially the same spatial position as an unsuccessfully decoded pixel to be present in temporally adjacent images.

In summary, when an image region is encoded according to a differential encoding process such as DPCM, image regions identified on a storage medium may lack a proportion of pixel representations. Since a current difference value is determined from a reference pixel value and intermediate difference values in an order of encoding dependency, an unsuccessfully decoded pixel prevents subsequent differential pixel values from being successfully decoded.

SUMMARY OF THE INVENTION

This invention provides an encoding apparatus operable to encode video data representing successive images, each image comprising a plurality of pixels, the apparatus comprising:

a differential encoder arranged to encode each image as one or more predetermined image regions, each image region being encoded as a reference value and at least one differential pixel value, the differential pixel value(s) being derived in dependence on the reference value and/or other differential pixel value(s) in accordance with an order of encoding dependency;

in which, for each image region, the differential encoder is operable in a first encoding mode for a first subset of the images to encode the image region using a first order of encoding dependency and in a second encoding mode for a second, different, subset of the images to encode the image region using a second, different, order of encoding dependency, and in which the first and second subsets of images are arranged with respect to one another so that, from image to image, each image region is encoded in accordance with a predetermined sequence of orders of encoding dependency.

The invention recognises that a limitation on techniques such as temporal concealment in previous DPCM-based systems is the use of the same order of encoding dependency from image to image. For example, in a block based encoding system the order of encoding dependency might have been a raster scan arrangement from top-left to bottom-right, and always the same from image to image. This would mean that if data errors were encountered in such previous systems, it would always be the same part of the image region (in the example, the bottom-right portion) which would be unsuccessfully decoded. This would prevent the use of temporal concealment for that part of the region.

The invention addresses this problem by providing at least two different orders of encoding dependency, each applicable to a subset of images. In this way, the pixels which are most likely to suffer in the event of data loss are varied from image to image. This can mean that pixels at various positions in an image region can be successfully decoded in different images, so allowing temporal concealment to be used more effectively.

The feature that the first and second subsets of images are arranged with respect to one another so that, from image to image, each image region is encoded in accordance with a predetermined sequence (e.g. a repeating sequence) of orders of encoding dependency can simplify the arrangements needed at decoding to detect which order of encoding dependency has been used.

Preferably the predetermined sequence is such that, for each pair of consecutive images, an image region is encoded using different orders of encoding dependency. This gives a more robust system in difficult decoding conditions, such as during shuttle replay in a tape-based system, in that it allows different parts of an image region to be decoded in successive images. This in turn can improve the concealment of unsuccessfully decoded pixels.

For elegant simplicity and ease of decoding, preferably the first and second subsets comprise complementary sets of alternate images, such as alternate fields of an interlaced video signal.

To give a greater difference between encoding modes in order to reduce the effects of missing pixels, it is preferred that the reference values in the first encoding mode and the reference values in the second encoding mode respectively represent pixels at different spatial positions within the image regions. Indeed, it is preferred that the reference values in the first encoding mode and the reference values in the second encoding mode respectively represent pixels at substantially opposite peripheral positions within the image regions.

This invention also provides a decoding apparatus operable to decode video data representing successive images, each image comprising a plurality of pixels, the apparatus comprising:

a differential decoder arranged to decode each image as one or more predetermined image regions, each image region being encoded as a reference value and at least one differential pixel value, the differential pixel value(s) being derived in dependence on the reference value and/or other differential pixel value(s) in accordance with an order of encoding dependency, in which, for each image region, the differential decoder is operable in a first decoding mode for a first subset of the images to decode the image region in accordance with a first order of encoding dependency and in a second decoding mode for a second, different, subset of the images to decode the image region in accordance with a second, different, order of encoding dependency; and means for detecting the decoding mode to use for each image region.

Preferably the apparatus comprises means for detecting whether or not pixels of the decoded image have been validly decoded; concealment logic for deriving concealment pixel values from previously decoded pixels to conceal invalidly decoded pixels; and means for applying the concealment pixel values to conceal invalidly decoded pixels.

Preferably the concealment logic comprises means for detecting the temporal separation, with respect to the video signal, between the current image and the image in respect of which the previously decoded pixels were decoded; and the means for applying is operable not to apply a concealment value to conceal a current invalidly decoded pixel if the temporal separation is greater than a threshold temporal separation. This avoids concealment values being used indefinitely; a concealment value, derived from one or more previous pixel values, is used only for a certain period (number of video images) after the previous pixel(s) were decoded.

Preferably the concealment logic comprises means for detecting whether the previously decoded pixels were validly decoded; and the means for applying is operable not to apply a concealment value to replace a current invalidly decoded pixel if the previously decoded pixel(s) used to generate that concealment value were not validly decoded. This avoids concealing pixels on the basis of earlier invalidly decoded pixels.

It will be appreciated that in some embodiments, a previously decoded pixel could directly form a concealment value at that pixel position.

This invention also provides a decoding apparatus operable to decode video signal data representing successive images, each image comprising a plurality of pixels, the apparatus comprising: means for detecting whether or not pixels of the decoded image have been validly decoded;

concealment logic for deriving concealment pixel values from previously decoded pixels to conceal invalidly decoded pixels, the concealment logic comprising means for detecting the temporal separation, with respect to the video signal, between the current image and the image in respect of which the previously decoded pixels were decoded; and means for applying the concealment pixel values to conceal invalidly decoded pixels; the means for applying being operable not to apply a concealment value to conceal a current invalidly decoded pixel if the temporal separation is greater than a threshold temporal separation.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 2A is a schematic diagram illustrating how processing of a block of image data is conventionally performed during DPCM compression;

FIG. 2B is a schematic diagram illustrating how missing pixel data affects the ability of the decoder to reconstruct pixel values that have been encoded using a conventional DPCM compression process;

DESCRIPTION OF THE PREFERRED EMBODIMENTS

Figure 1:
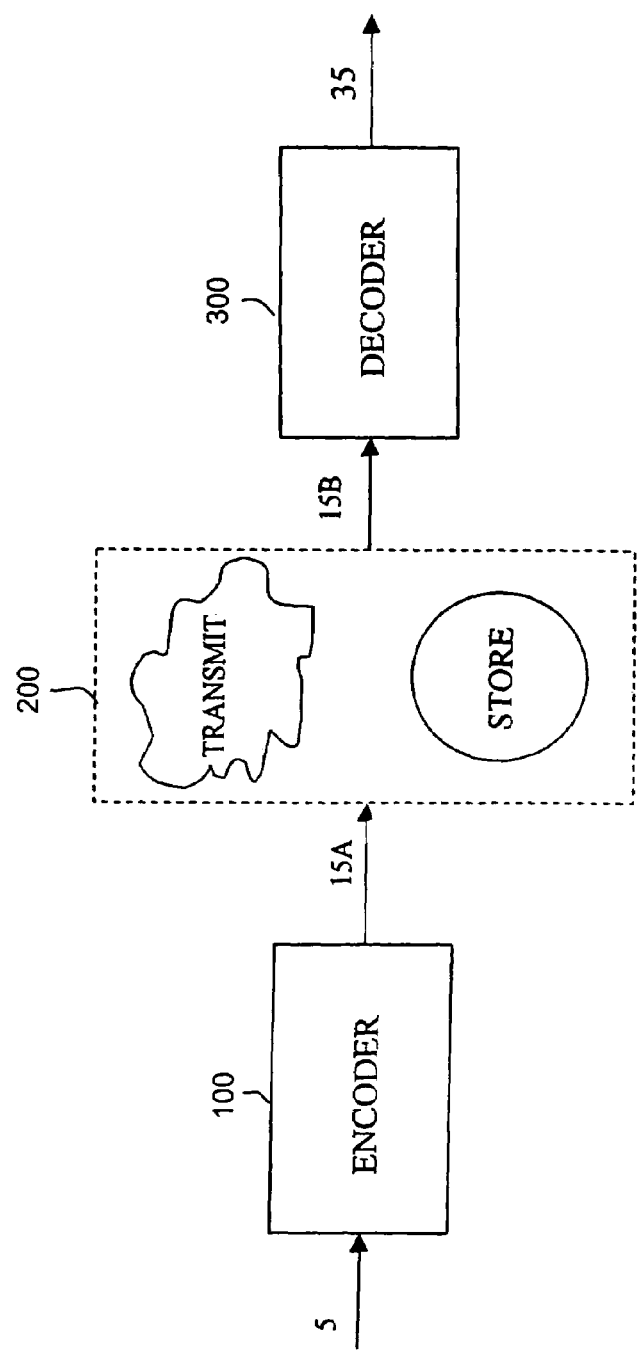
FIG. 1 is a schematic diagram of a compression encoder and a corresponding decoder for use with a data recording/reproducing device or a data transmission/reception system.

FIG. 1 is a schematic diagram of a data compression system. This system comprises an encoder 100, a data transfer link 300 and a decoder 200. The encoder 100 receives an input video signal 5. The encoder 100 models the video image data to remove redundancy and to exploit its statistical properties. It produces encoded data symbols that represent the information in the input video signal 5 in a compressed format. The encoder 100 outputs a compressed data signal 15A that is supplied to the data transfer link 300 where it is either transmitted across a communication channel or stored on a recording medium. A compressed data signal 15B having been either read from the recording medium or received across a communication network is supplied to the decoder 200 which decodes the compressed data signal 15B and outputs a reconstructed image signal 35. Loss of some encoded data symbols is likely to occur between the output 15A of the encoder and the input 15B to the decoder. Such data loss may arise due to a noisy data link in a computer communication system or as a result of data being read from the recording medium at high speed during a video shuttle operation of a playback device.

The impact of the data loss on the reconstructed image signal 35 will vary depending on the encoding technique employed. In DPCM type modelling techniques that encode data in the spatial domain and predict original data symbols from the other reconstructed data symbols, the playback quality is particularly adversely affected when a proportion of the encoded data of an encoded image region is lost. For data encoded in the spatial domain the effects of missing data in the reproduced image tend to be spatially localised. By way of contrast for data transformed to the frequency domain prior to encoding, the effects of missing data will typically be to reduce the overall resolution of the reproduced image region rather than to produce localised effects.

Conventionally, when DPCM encoding is applied to an image field (or frame), the field is divided into blocks such as the 8×8 block of pixels illustrated in FIG. 2A. The pixels of each image block are scanned in a predetermined order and this scanning order determines the encoding sequence of the image block data. In FIG. 2A an "S-type" scan line SL is shown whereby adjacent pixels values are read along each row of the block and the scan direction alternates from row to row. The starting point of the scan, in this case the top left-hand pixel value $S_0$, is the reference pixel value. It is only for the reference pixel that the original sample value itself is encoded. For the remainder of the pixels in the block, the differences $\Delta_j$ between successive image pixel values are encoded rather than the pixel sample values $S_k$ themselves.

In an alternative method, the first pixel is predicted from the mean (i.e. DC value) of the block such that the mean value is used as the reference value. In this case every pixel is coded as a prediction and only the mean value is encoded. In a further alternative method the first pixel can be predicted from the mid-point of a range of possible values, for example the value 128 for 8-bit values.

Data compression is achieved in lossless DPCM because the differences $\Delta_j$, between pixel values are typically smaller than the pixel sample values themselves hence fewer bits are required to encode the differential pixel values $\Delta_j$. In the example of FIG. 2A the transmitted image values correspond to the reference value $S_0$ and differential pixel values $\Delta_j = S_j - S_{j-1}$, where $1 \leq j \leq (n-1)$. The differential image data typically has a greatly reduced variance compared to the original image data and is significantly less correlated.

The decoder produces reconstructed image sample values $S^R$ from the differential pixel values and the reference value according to the equation: $S^R_j = S^R_{j-1} + \Delta_j$ where $1 \leq j \leq (n-1)$. It can be seen from this equation that a current pixel is reconstructed by adding the current differential pixel value to the most recently reconstructed pixel value. Note that the sequence of pixel reconstruction is determined by the sequence of pixel encoding. If the differential pixel value $\Delta_m$ is missing from the data stream arriving at the decoder then the reconstructed pixel value $S^R_m$ will be an omitted pixel value for which no data is present. Furthermore, pixel values $S^R_j$ (where $m < j \leq n-1$) subsequent to the omitted pixel in the encoding sequence cannot be successfully decoded. This is illustrated by FIG. 2B where the missing pixel data is shown as a black shaded area. The missing pixel data corresponds to difference values $\Delta_{13}$, $\Delta_{14}$, $\Delta_{17}$ and $\Delta_{18}$. In this case the decoder cannot successfully decode pixel values that are beyond the pixel associated with $\Delta_{13}$ in the scanning order. The unsuccessfully decoded pixels correspond to the area shaded by diagonal lines in FIG. 2B.

For a conventional DPCM modelling process in which the scanning sequence is fixed from block to block and from field to field (or frame to frame), the likelihood of successfully decoding pixel values of an image region corresponding to the latter portion of the scanning sequence is low in comparison to the likelihood of successfully decoding pixel values in the first portion of the scanning sequence. A standard concealment technique replaces unsuccessfully decoded pixel values by copying the decoded pixel values from substantially the same spatial position in a temporally adjacent image. However if the likelihood of the decoder encountering missing data is high it follows that the likelihood successfully decoding pixels in the latter portion of the image region in temporally adjacent fields is low. This makes concealment of missing data in known DPCM modelling processes difficult. Although full resolution may not be required e.g. when viewing images in shuttle mode of a playback device, it will be appreciated that if a given portion of the image region is consistently unsuccessfully decoded this is likely to be noticeable to a viewer.

Figure 3:
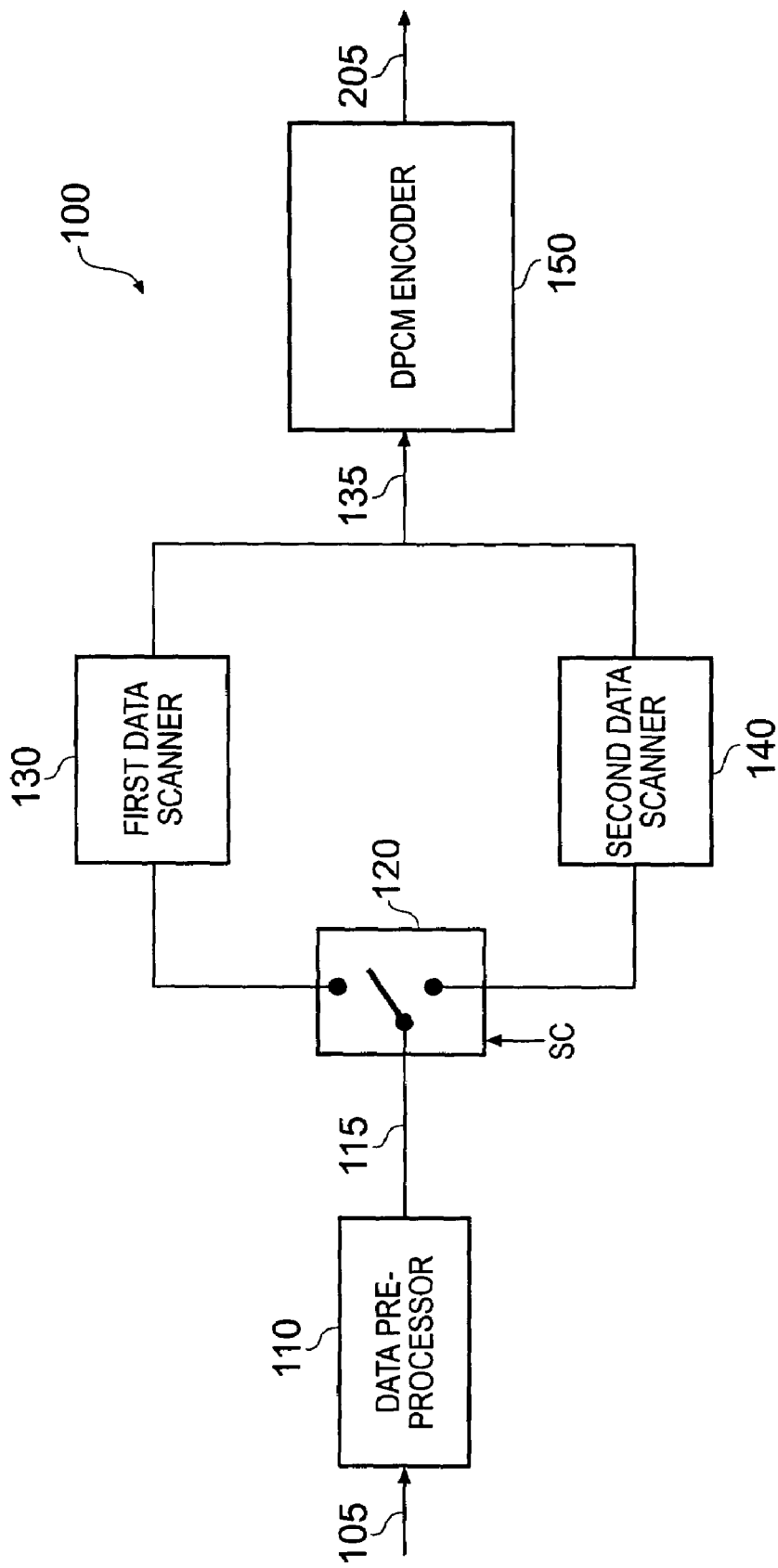
FIG. 3 schematically illustrates a bit rate reducing encoder according to an embodiment of the invention.

FIG. 3 schematically illustrates a bit-rate reducing encoder according to an embodiment of the invention. The encoder 100 comprises a data pre-processor 110, a switch unit 120, a first data scanner 130, a second data scanner 140 and a DPCM encoder 150.

Data corresponding to original RGB sample values of successive video images are supplied as input to the data pre-processor 110. The data could alternatively be supplied in $YC_BC_R$ format. The images can be processed either in a progressive frame mode or in an interlaced field mode. The data pre-processor serves to divide the input data of each image into image blocks comprising 16 horizontal by 16 vertical ($16_H \times 16_V$) pixel sample values for each of the signal components R, G, B. The data pre-processor shuffles the image blocks according to a predetermined shuffle ordering that serves to interleave the image data so that blocks of pixels which are adjacent in the input image frame are not read out at adjacent positions in the shuffle ordering. This shuffling process alleviates the effect of data losses on the image reconstructed by the decoder apparatus. Pixel blocks that are adjacent to each other in the input video frame are separated in the shuffled bit stream. A short duration data loss in which a contiguous portion of the bit stream is corrupted may affect a number of data blocks, but due to the shuffling these blocks will not be contiguous blocks in the reconstructed image.

The image block data signal 115 is output by the data pre-processor 110 and supplied to the switch unit 120. The switch unit operates under the influence of a switch control signal SC to supply the image data signal 115 block by block to either the first data scanner 130 or the second data scanner. In interlaced field mode, image blocks comprising a first field are each fed to the first scanner 130 whereas the image blocks of a second, complementary field are supplied to the second scanner 140. Similarly, in frame mode the switch 120 alternates between the first scanner 130 and the second scanner from frame to frame.

Figure 5A:
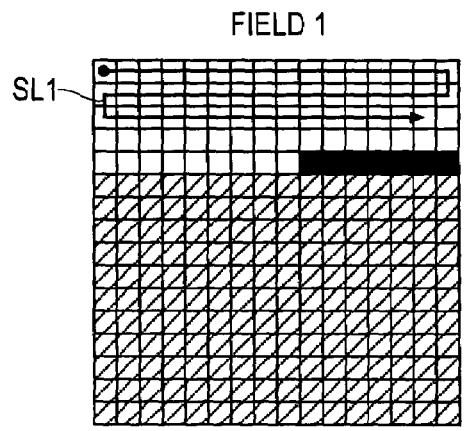
FIGS. 5A and 5B schematically illustrate how processing of a 16 by 16 block of image data is performed during DPCM compression according to embodiments of the invention.

As illustrated in FIG. 5A, the first data scanner 130 scans each $16_H \times 16_V$ image block using an S-type scan line SL1, starting from a reference pixel value at the top left-hand corner of the block and proceeding throughout the block until it reaches the bottom left-hand pixel value. The first scanner 130 delivers the data to the DPCM encoder in an order determined by this first scanning sequence SL1. The second data scanner 140 also performs an S-type scan SL2 but it starts from a different reference pixel value at the bottom left hand corner of the $16_H \times 16_V$ image block and proceeds upwards throughout the block until it reaches the top left-hand pixel value. The second scanner 140 delivers the data to the DPCM encoder in an order determined by this second, different scanning sequence SL2. The ordering of scanning sequence SL2 relative to SL1 ensures that the forward and reverse scans meet in the middle when an S-type scan is used.

The DPCM encoder 150 encodes the data supplied to it from the first and second data scanners 130, 140 such that the order of encoding dependency is determined by the scanning sequence SL1 SL2 respectively. Thus in interlaced field mode, the encoding dependency of the first field of a frame is arranged to be different from the encoding dependency of the complementary field of the frame. Similarly, in frame mode the encoding dependency of adjacent frames in a temporal sequence differs. As a consequence of the two different encoding dependencies of the sample values, it is possible to ameliorate the effects of missing pixel data in the reconstructed images. The way in which the effects of missing pixel data are overcome by embodiments of the invention will be explained in detail below with reference to FIG. 5 C,D.

Figure 4:
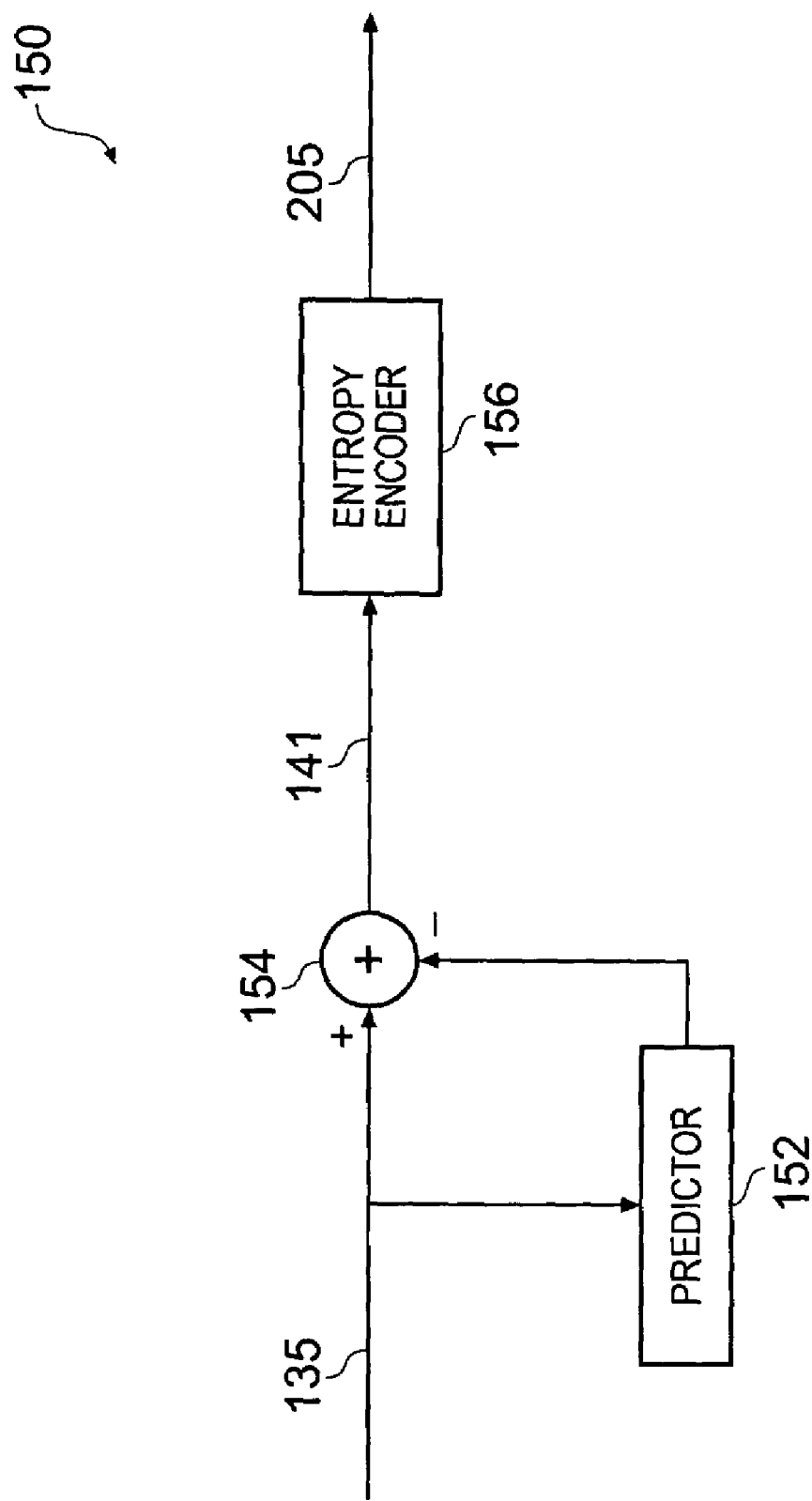
FIG. 4 is a schematic diagram of the DPCM encoder of FIG. 3.

FIG. 4 is a schematic diagram of the DPCM encoder of FIG. 3. The scanner output signal 135 from either the first scanner 130 or the second scanner 140 is supplied as input to the DPCM encoder 150. The DPCM encoder comprises a prediction processor 152, an adder 154 and an entropy encoder 156.

In the DPCM encoder 150, the input signal 135 is fed both to the prediction processor 152 and as a first input to the adder 154. The prediction processor 152 performs a calculation to predict the current pixel value from one or more preceding pixel values in the scanning sequence. In this embodiment of the invention the current pixel is predicted from the immediately previous pixel in the scanning sequence and hence the prediction processor simply provides a one-sample time delay. The output of the prediction processor is supplied as a second input to the adder 154, where it is subtracted from the current sample value to produce a differential pixel value $\Delta_j$. The output signal 141 from the adder 154 is supplied as input to the entropy encoder 156. The entropy encoder 156 applies entropy coding to the data. In this particular embodiment, Golomb coding is used. The output of the entropy encoder 205 comprises encoded image data that may subsequently be transmitted across a communications network or recorded on a recording medium such as a tape or a disc.

In an alternative embodiment of the DPCM encoder, the prediction processor 152 could predict the current pixel value by:—using an average of pixels in the spatial neighbourhood of the current pixel; using an appropriately weighted linear sum of a number of pixel values preceding the current pixel in the scanning sequence; or by adaptively predicting the current pixel value based on the statistics of the current image.

Further alternative embodiments of the invention may lower the overall data rate by adding a quantiser to the lossless DPCM encoder of FIG. 4. In forming a prediction, the decoder only has access to the reconstructed pixel values and not to the original sample values. Since quantisation of the differential image introduces error (i.e. it is a lossy compression process) the quantiser in these alternative embodiments should preferably be located within the prediction loop in the DPCM encoder. This ensures that the encoder, like the decoder, bases its predictions on the reconstructed pixel values which improves the accuracy of the predicted values.

Figure 5B:
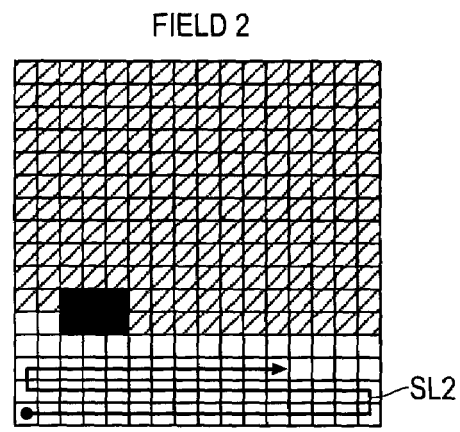

FIGS. 5A and 5B schematically illustrate how processing of a $16_H \times 16_V$ block of image data is performed during DPCM compression according to embodiments of the invention. FIG. 5A shows the first field of a frame that is scanned using an S-type scan SL1 starting from a reference pixel the top left-hand corner of the image block as indicated by the arrow. This is in accordance with the operation of the first data scanner 130 of FIG. 3. Missing pixel data is shaded in black whereas pixel values that cannot be successfully reconstructed by the decoder (as a consequence of the missing pixels) are shaded by diagonal lines.

FIG. 5B shows the second field of a frame that is complementary to the first field of FIG. 5A. This second field is scanned using an S-type scan SL2 starting from a reference pixel at the bottom left-hand corner of the image block as indicated by the arrow. This scanning sequence corresponds to the operation of the second data scanner 140 of FIG. 3. In this second field the locations of missing pixel data are different from the locations of the missing pixels in the first image field.

Figure 5C:
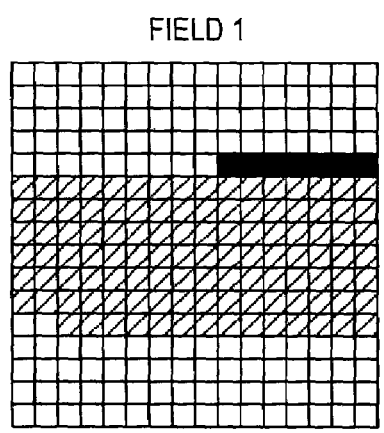
FIGS. 5C and 5D schematically illustrates the reduced effects of missing pixel data on the reconstructed image block of FIGS. 5A and 5B respectively according to embodiments of the invention.
Figure 5D:
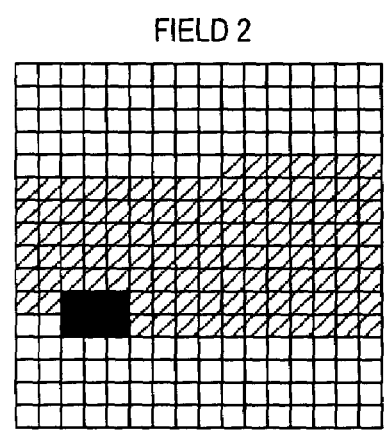

FIGS. 5C and 5D schematically illustrate how the effects of missing pixel data on the reconstructed image block of FIGS. 5A and 5B are reduced according to embodiments of the invention. The image block of field 1 and the corresponding image block of field 2 each have missing encoded pixel values as shown in FIGS. 5A and 5B respectively. For each block this prevents successful decoding of pixels subsequent to the first missing pixel in the scanning sequence. However, since the scanning sequence of field 2 is different from the scanning sequence of field 1 and the two scanning sequences start at opposite sides of the image, the unsuccessfully decoded pixels in the lower portion of the first field data block can be concealed by copying the successfully decoded pixel values from the lower portion of the second field data block. Similarly, the reconstructed data from the upper portion of the first field is used to substitute for the unsuccessfully decoded pixels of the upper portion of the data block of the second field. Note that in interlaced field mode the rows of the $16_H \times 16_V$ block of the second field are interlaced with the rows of the corresponding $16_H \times 16_V$ block of the first field thereby forming a $16_H \times 32_V$ region of the reproduced image frame. In frame mode the reconstructed pixels from one frame can be copied from a $16_H \times 16_V$ image block to conceal the unsuccessfully decoded pixel data of a corresponding $16_H \times 16_V$ image block of an adjacent frame.

Figure 6:
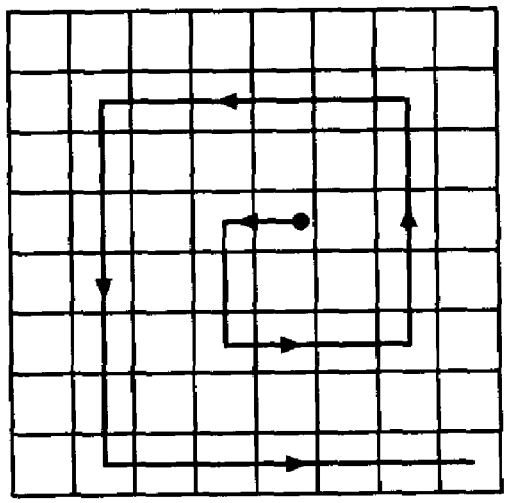
FIG. 6 schematically illustrates alternative spiral scanning sequences.
Figure 6:
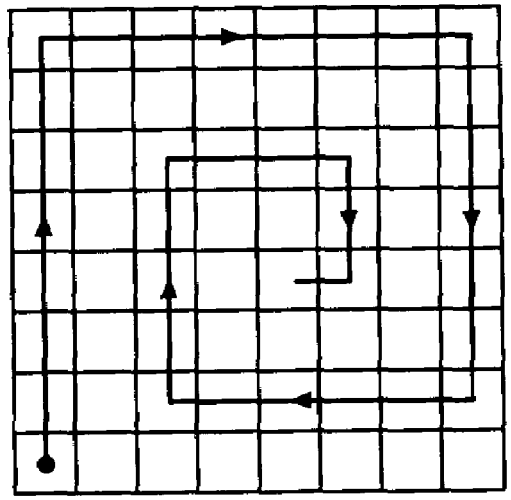

It will be appreciated that although in the above example two different S-type scans are used to provide different orders of encoding dependency according to the present invention, various other scan types could be performed such as a raster scan, a zig-zag scan or a spiral scan. FIG. 6 schematically illustrates two complementary spiral scanning sequences. The spiral scans allow maximum space to be covered if only, for example, half of the pixels of a Macro-Block are recovered. The missing pixels in between the recovered pixels can then easily be interpolated from their neighbours. An advantage of the spiral scan and of the S-type scan is that each pixel in the scanning order is spatially adjacent to the previous pixel which potentially allows more efficient entropy encoding. This is not the case for a raster scan.

Figure 7:
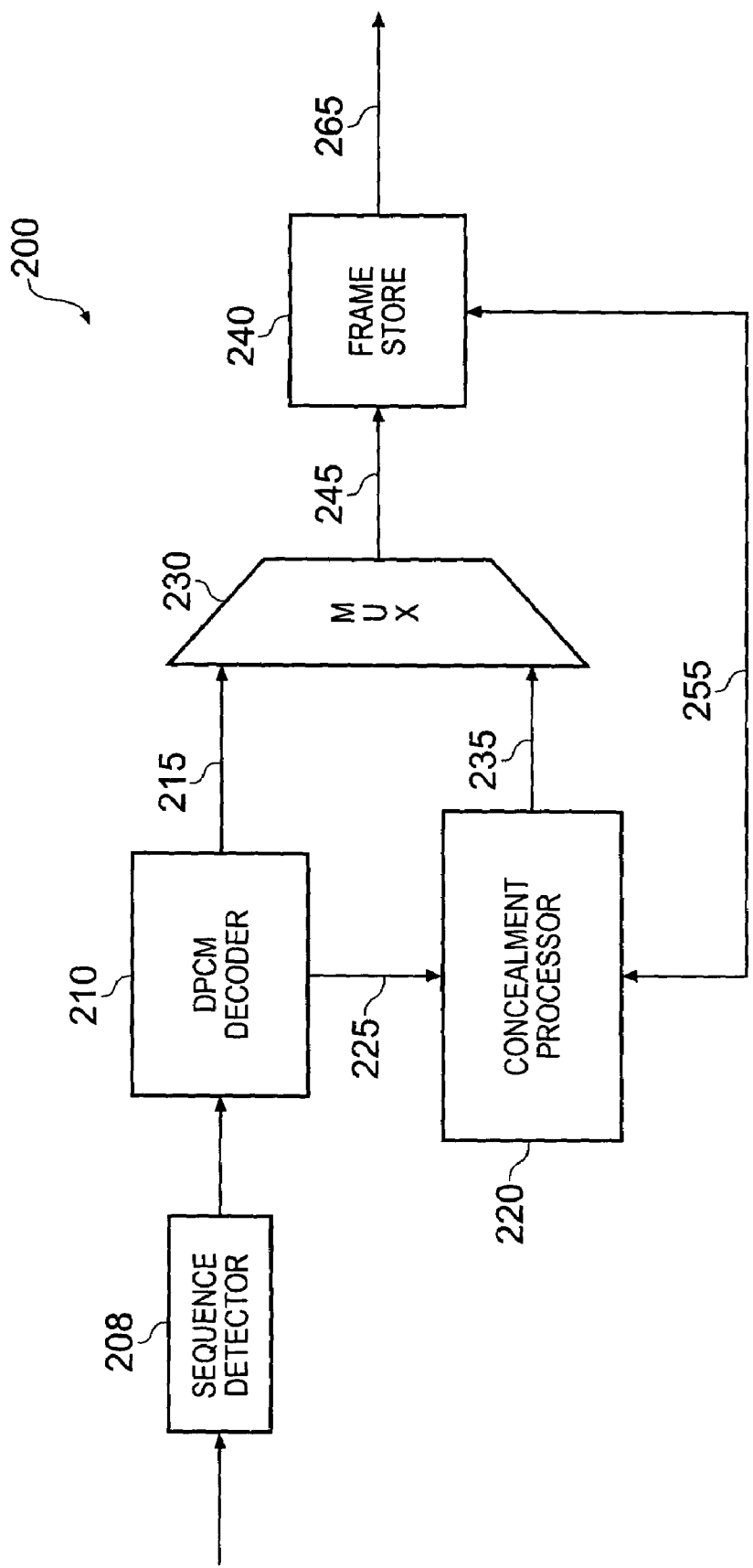
FIG. 7 schematically illustrates a decoder according to an embodiment of the invention.

FIG. 7 schematically illustrates a decoder according to an embodiment of the invention. The decoder 200 comprises a sequence detector 208, a DPCM decoder 210, a concealment processor 220, a multiplexer 230 and a frame store 240.

The decoder 200 receives an encoded signal that has been either read from a recording medium or transmitted across a communications network. The decoder 200 must take account of the scanning sequence that was used during DPCM encoding an image block in order to write the reconstructed pixel sample values to the appropriate memory address in the frame store 240. In this embodiment of the invention, for each pair of consecutive images an image region is encoded using different scanning sequences and hence have different orders of encoding dependency. The sequence detector 208 uses scanning sequence flags embedded in the encoded data stream to determine whether the first or second scanning sequence was used in the encoding of each field/frame. The output of the sequence detector 208 is supplied as input to the DPCM decoder 210. The DPCM decoder 210 performs a block by block decoding process to produce reconstructed pixel values from the encoded data symbols.

Figure 8:
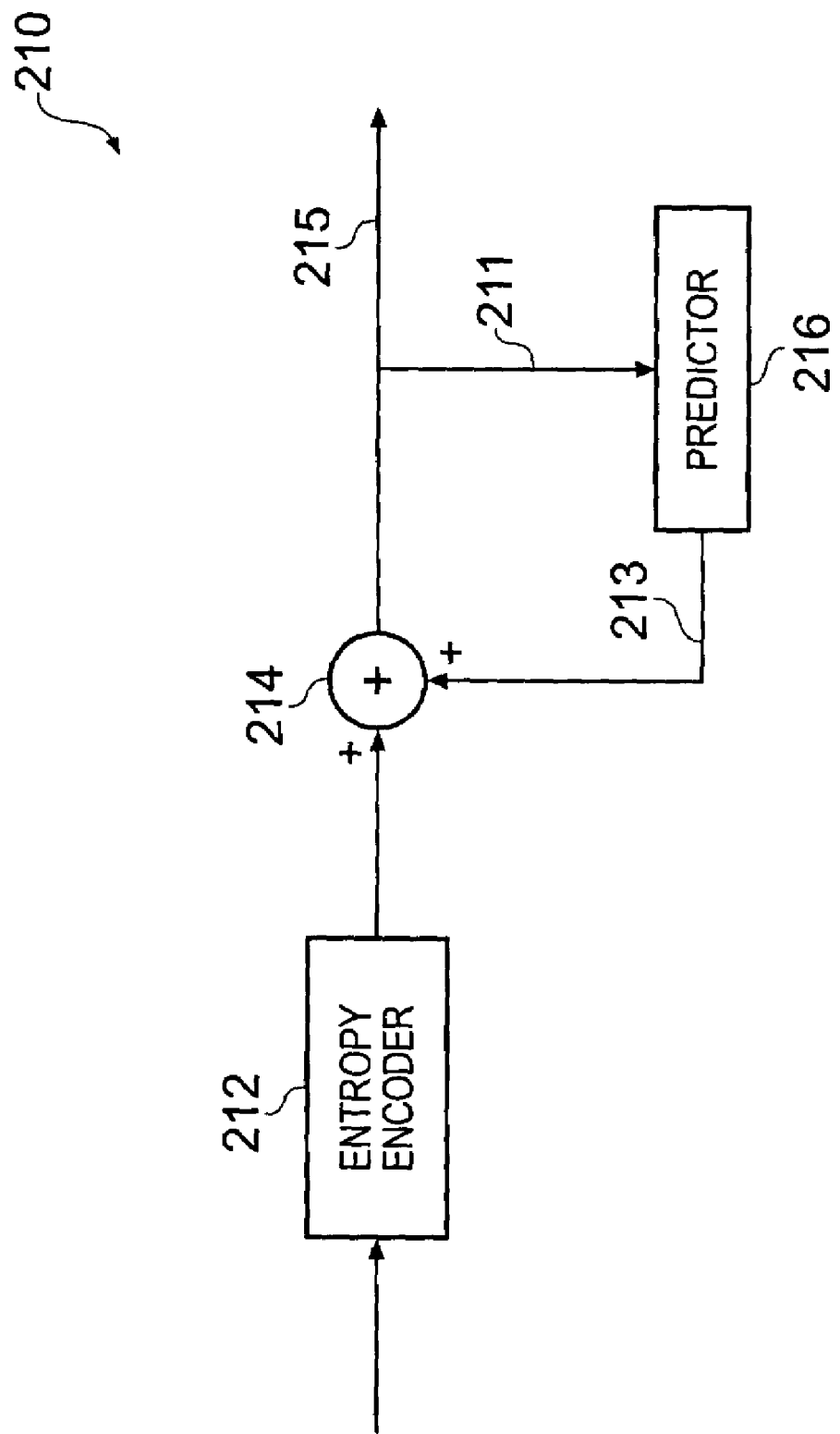
FIG. 8 is a schematic diagram of the DPCM decoder of FIG. 7.

FIG. 8 schematically illustrates the internal structure of the DPCM decoder 210. The DPCM decoder 210 effectively reverses the encoding process performed by the DPCM encoder 150 of FIG. 4. The DPCM decoder comprises an entropy decoder 212, an adder 214 and a prediction processor 216.

The entropy decoder 212 processes the encoded signal to reverse the Golomb coding performed by the entropy encoder 156. The output from the entropy decoder 212 is supplied as a first input to the adder 214. An output from the adder 214 is supplied to the prediction processor 216 which uses the same method as the prediction processor 216 of the encoder 152 to reconstruct the current pixel. In this case the prediction processor 216 simply provides a one sample time delay. The adder 214 adds the differential value $\Delta_j$ of the current pixel to the value of the most recently reconstructed pixel. The direct output signal 215 of the adder comprises reconstructed pixel values.

Returning to FIG. 7, the output signal 215 from the DPCM decoder 210 is supplied to the multiplexer 230. The DPCM decoder 210 further outputs a signal 225 to the concealment processor that gives an indication of which pixel values were unsuccessfully decoded. The concealment processor 220 is in two-way communication with the frame store 240. The frame store 240 holds decoded image sample values for each field or each frame in memory. The concealment processor 220 is operable to copy successfully decoded data from a differently scanned image block in a complementary field or an adjacent frame in order to conceal unsuccessfully decoded pixels. This concealment technique was described in more detail above with reference to FIG. 5. In alternative embodiments of the invention the concealment processor may additionally use known concealment methods such as spatial interpolation for certain image regions. The concealment processor 220 outputs concealment data to the multiplexer 230 which multiplexes it with the successfully decoded data and supplies the reconstructed pixel values to the frame store 240.

In an alternative embodiment of the invention the concealment processor 220 is also operable to conceal unsuccessfully decoded pixel values using the DC value which is simply the mean pixel value of the block. This method is particularly suitable where the prediction for the first pixel in the block is made from the mean value. In this case the mean value is transmitted separately and thus can easily be used to perform concealment. In FIG. 5D the mean value would be used to conceal the missing pixels towards the middle of the frame.

An alternative concealment processor is operable to simply copy the last successfully decoded pixel or to copy the last successfully decoded pixel in each column to conceal the missing pixels.

Figure 9:
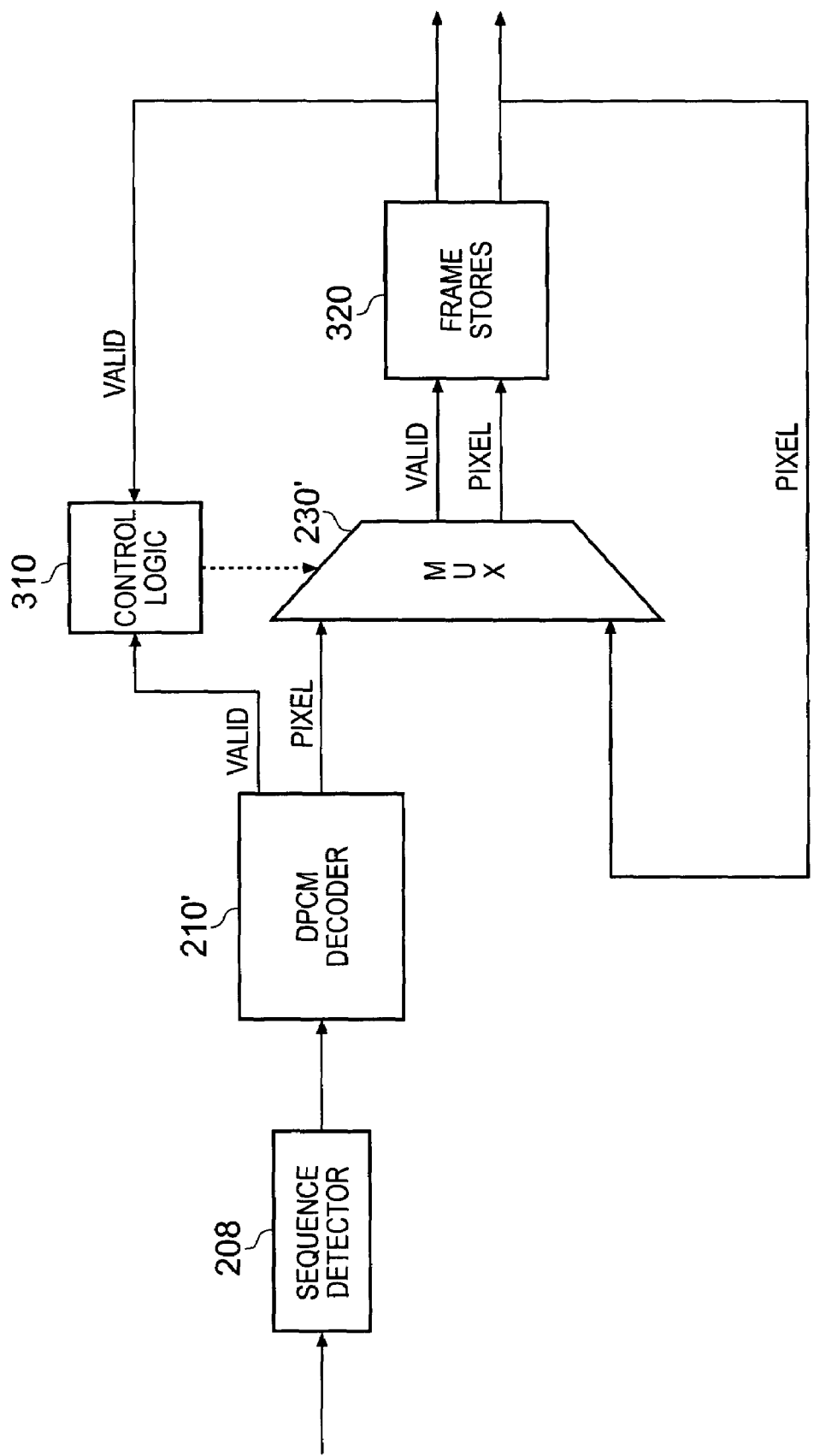
FIG. 9 schematically illustrates a second embodiment of a decoder.

FIG. 9 schematically illustrates a second embodiment of a decoder. In this embodiment, validity data is stored with the pixel data indicating whether the pixels have been correctly decoded. This validity data is used to control whether a newly decoded pixel should be stored in the frame stores, or whether a corresponding pixel from a previous field or frame should be used instead.

In this embodiment the DPCM decoder 210' generates two outputs: pixel data and associated validity data indicating whether the pixel data was correctly decoded from the input data stream. The pixel data is supplied to a multiplexer, 230', and the validity data is supplied to control logic 310 which controls the operation of the multiplexer 230'. The multiplexer 230' receives, as a second input, fed-back pixel data from a set of frame stores 320, and the control logic 310 receives, as a second input, fed-back validity data from the frame stores 320.

The fed-back pixel and validity data are derived from corresponding pixel positions in the preceding field or frame. To use data from the preceding frame is preferable in that the pixel position may be identical, but the data is separated temporally from the current pixel by a frame period. Pixel data from the preceding field halves the temporal difference but introduces a spatial error in that the pixel position will be displaced from the current pixel. Either solution is a compromise, and so the system designer has to select the most appropriate compromise for that system.

In operation, as each pixel is decoded it is supplied to the multiplexer, along with a fed-back pixel suitable for use as a concealment value at that pixel position. The validity flags associated with the newly decoded pixel and the fed-back pixel are compared at the control logic 310.

If the validity flag associated with the newly decoded pixel indicates that the newly decoded pixel is "valid", then the newly decoded pixel is written into the frame store, regardless of the state of the fed-back validity flag.

If the validity flag associated with the newly decoded pixel is "invalid" and the fed-back validity flag is "valid" then the fed-back pixel is stored in the frame store. (This situation is handled differently in a further embodiment described below).

If the validity flag associated with the newly decoded pixel and the fed-back validity flag are both invalid, then the newly decoded pixel is stored in the frame store.

Figure 10:
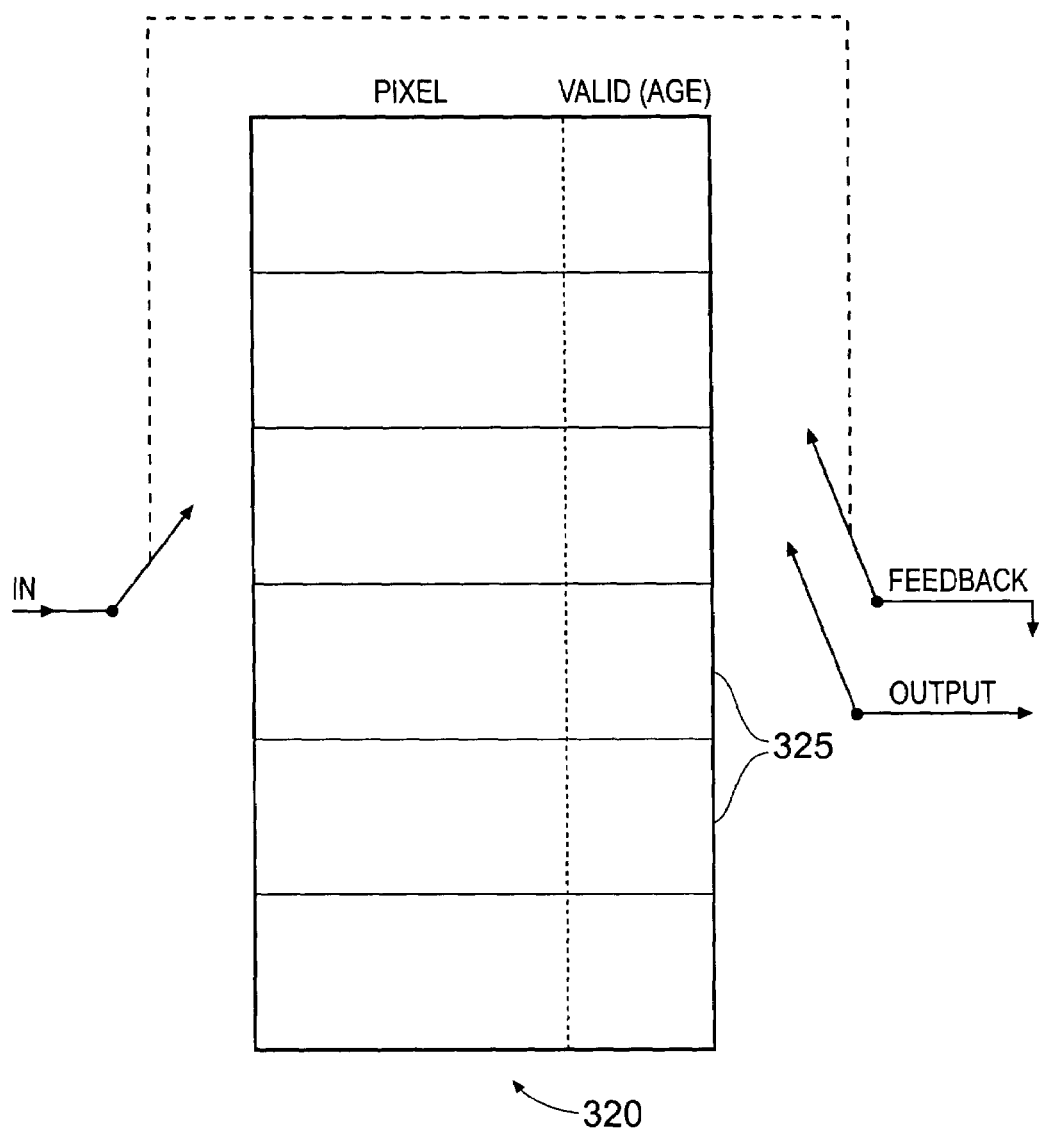
FIG. 10 schematically illustrates a frame store arrangement.

FIG. 10 schematically illustrates a frame store arrangement 320.

The frame store arrangement is partitioned into a group of storage areas 325, shown schematically as horizontal divisions on FIG. 10. Each storage area 325 can store one field of pixel data, with associated validity data. ("Age" or "timestamp" data may also be stored—this will be described below with reference to FIGS. 13 to 15). So, a pair of storage areas are used to store data representing one frame.

Writing into the frame store arrangement, and reading from it, take place in rotation, so that data are written into one pair of storage areas as a frame is decoded, and then are read out from that pair of storage areas in a subsequent frame period to form an output frame. Of course, it will be appreciated that the fed-back pixel and associated data described with reference to FIG. 9 is read out from a different storage area to the one currently being written to.

Although the output and feedback signals could be identical, the arrangement of FIG. 10 is that they are not necessarily so. The selection of a store for the feedback signal is tied to the selection of a store for the writing of input data, so that the feedback signal is always derived from a store which is one store (one field or one frame, as described above) preceding the store currently being used to write input data. However, the store from which the output data is derived may or may not be tied to the "feedback" store. The user can select whether to use the feedback store as the output store, or to use the store preceding the feedback store. The latter option imposes a two-frame delay between input and output.

Figure 11:
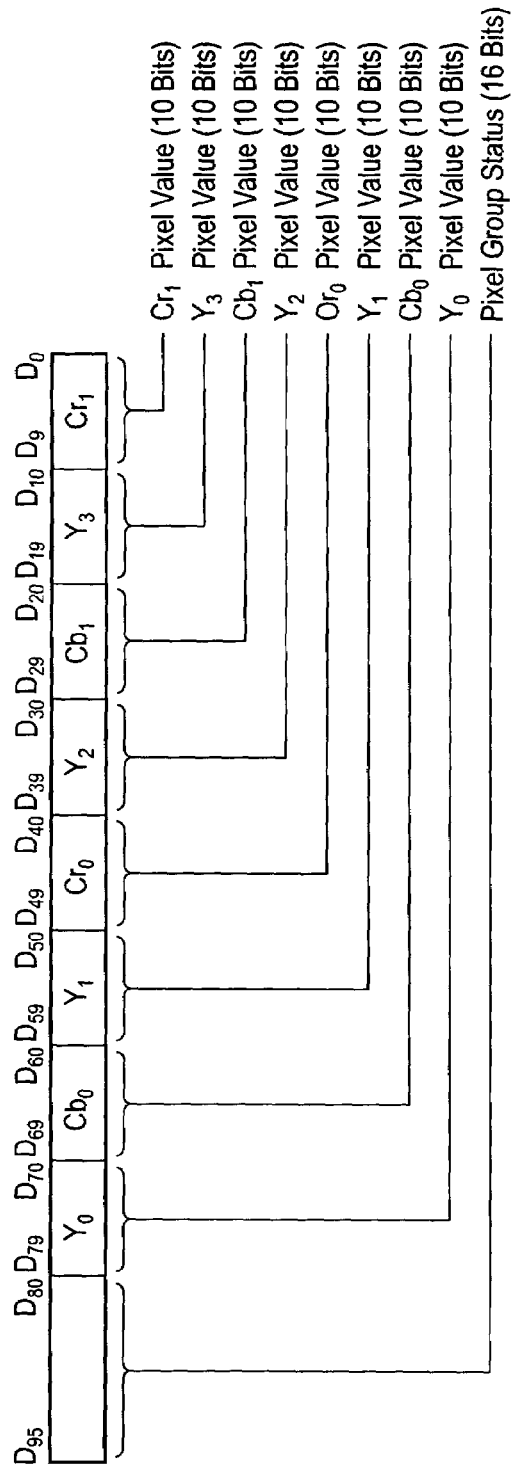
FIG. 11 schematically illustrates a data format for use with a 4:2:2 video format.
Figure 12:
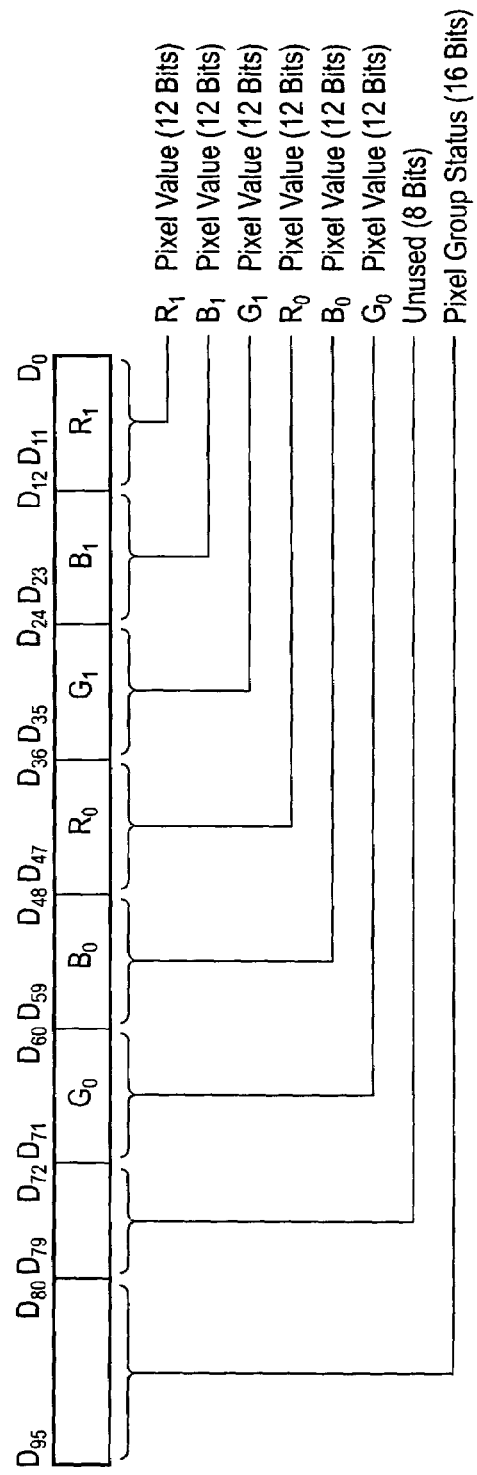
FIG. 12 schematically illustrates a data format for use with a 4:4:4 video format.

FIGS. 11 and 12 schematically illustrate possible data formats for data stored in the frame store arrangement 320. In particular, FIG. 11 schematically illustrates a data format for use with a 4:2:2 (Y Cr Cb) video format; and FIG. 12 schematically illustrates a data format for use with a 4:4:4 (R G B) video format. In each case, a 16-bit pixel group status flag is associated with a group of pixels, either four pixels (in the 4:2:2 format) or two pixels (in the 4:4:4 format). The pixel group status flag provides validity and timestamp information, which may be shared between the pixels in the group. However, the skilled man will understand that a respective set of timestamp and/or validity data could be provided for each individual pixel, or alternatively collective timestamp and/or validity data could be provided for larger groups of pixels.

Figure 13:
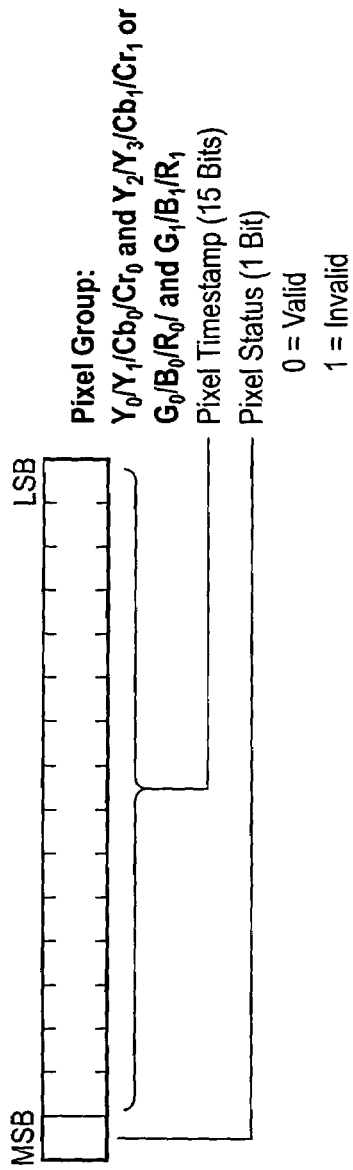
FIG. 13 schematically illustrates a single pixel group status field.

FIG. 13 schematically illustrates a single pixel group status field. This is an arrangement of the pixel group status flag so that it gives unitary information defining the status of the entire group of pixels to which it refers. In this example, the most significant bit (MSB) defines the validity of the group, and the remaining 15 bits of the field define a timestamp (see below).

Figure 14:
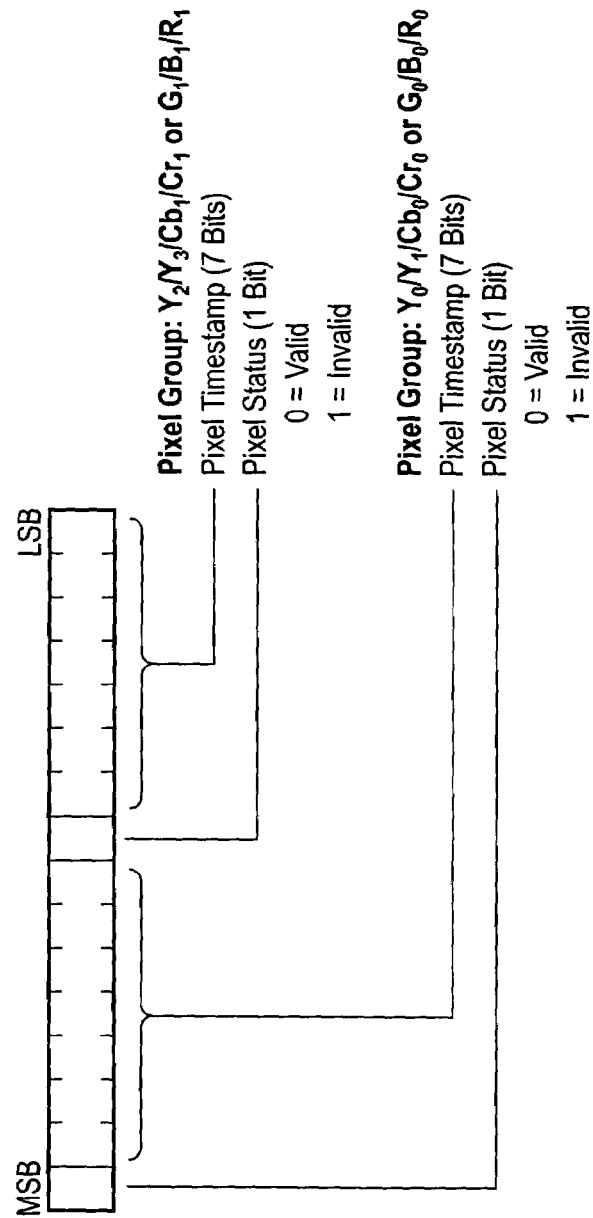
FIG. 14 schematically illustrates a double pixel group status field.

FIG. 14 schematically illustrates a double pixel group status field. This is another possible arrangement of the pixel group status flag so that it gives two sets of information defining the status of the group of pixels to which it refers. In this example, the field is divided into two bytes of 8 bits each. In each byte, the most significant bit (MSB) defines the validity of the group, and the remaining 7 bits define a timestamp (see below). Where this format is applied to a two-pixel arrangement (such as that shown in FIG. 12), then each pixel can have respective validity and timestamp information. Where this format is applied to a four-pixel arrangement, the four pixels need to be ordered (by convention) into two sub-groups of two, with each sub-group having its own validity and timestamp information.

Where validity information is shared between two or more pixels, it is necessary to define a convention to handle the case where the validity is different between pixels in the group. The safer convention, avoiding mislabelling invalid pixels as "valid", is to define that a group is labelled as invalid if any pixel in that group was not validly decoded. A corresponding convention for the timestamp information will be described below.

Figure 15:
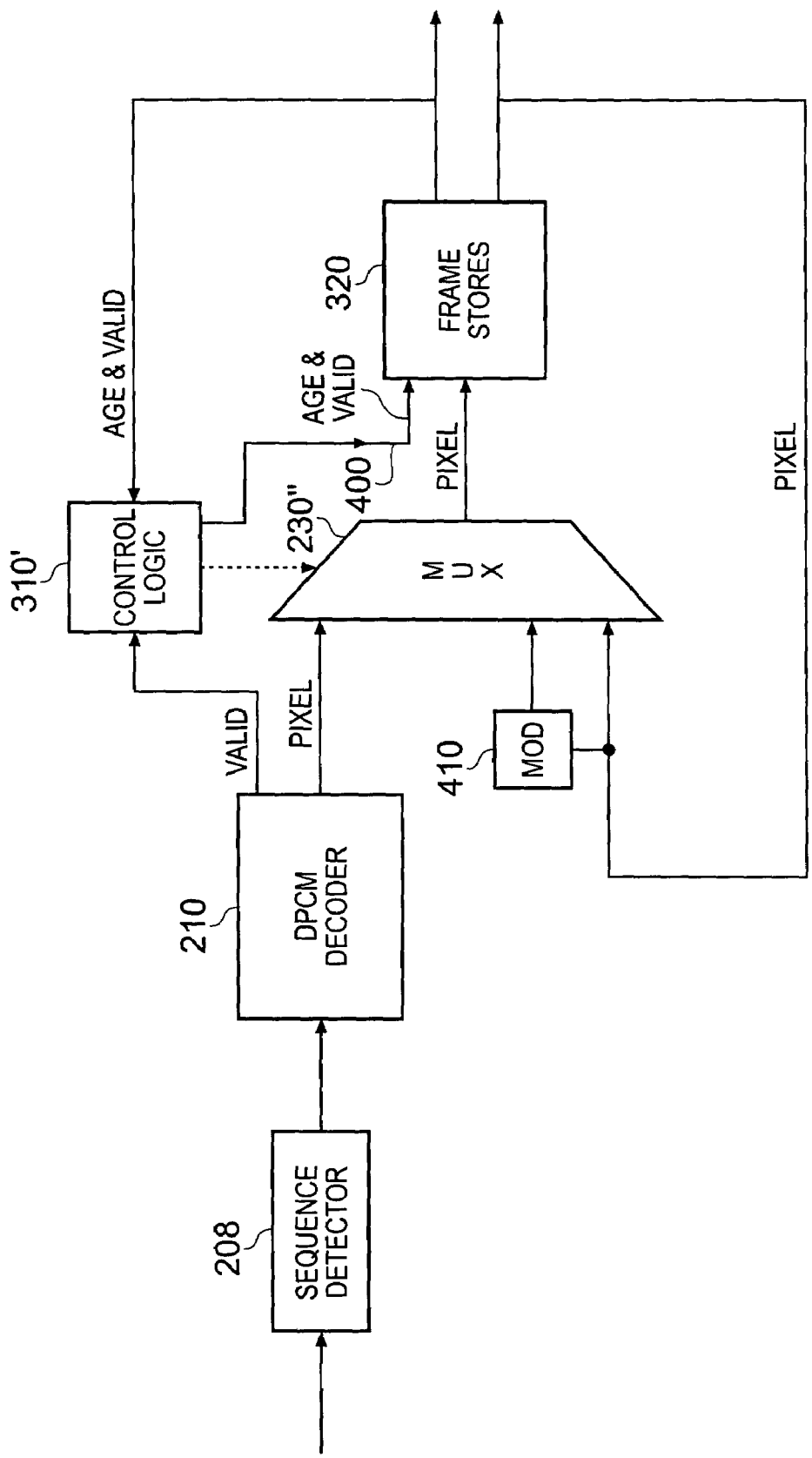
FIG. 15 schematically illustrates a third embodiment of decoder.

FIG. 15 schematically illustrates a third embodiment of decoder. In many respects this is similar in operation to the decoder of FIG. 9, and so only the differences will be described.

As part of the fed-back data associated with each pixel, a timestamp is also provided. Timestamps were mentioned above, and their storage in association with the pixel data was described. The purpose of the timestamp is to allow the system to limit number of frames over which a pixel is re-used. Basically, the timestamp can take one of two main forms: (a) an indication of the field or frame at which that pixel was first stored in the frame store 320, or (b) a running counter, incremented each frame, showing how long that pixel has been stored. In the first case, the timestamp can be compared with a current time to determine how long a pixel has been re-used. In the second case, which is the preferred embodiment to be described here, the timestamp starts at zero, is incremented each time a pixel is re-stored, and is compared with a threshold to determine if the pixel has been re-used too many times.

As before, there is a need for a convention in the case where one timestamp value is shared between two or more pixels. A convenient convention here is that the shared timestamp value represents the oldest (most re-used) of the pixels.

Referring back to FIG. 15, control logic 310' receives the validity flag associated with the current newly-decoded pixel, and also the validity and timestamp information associated with the current fed-back pixel. The control logic 310' controls a multiplexer 230" and also passes the validity and timestamp information to the frame store 320 for storing with the current pixel.

The multiplexer 230" can pass one of three inputs to form a current pixel value for storage in the frame store 320. These are: the newly decoded pixel, the current fed-back pixel value, or a modified pixel value derived by modifying logic 410 from the fed-back pixel value. The multiplexer 230" is controlled to select between these as follows:

If the validity flag associated with the newly decoded pixel indicates that the newly decoded pixel is "valid", then the newly decoded pixel is written into the frame store, regardless of the state of the fed-back validity flag and the timestamp. This aspect of the operation is identical to that of FIG. 9.

If the validity flag associated with the newly decoded pixel is "invalid" and the fed-back validity flag is "valid" then the question of whether the fed-back pixel is stored in the frame store depends on the timestamp of the fed-back pixel. If the timestamp shows that the fed-back pixel has been re-used (fed-back) fewer than a threshold number of times, then it is re-used again and the timestamp is incremented. However, if it has been re-used for the threshold number of occasions, then one or more of the following may be done:

- the fed-back data can be set—in one step, or over a number of frame periods—to a particular pixel value such as a bright orange pixel. This can indicate clearly to the viewer (user) that a long-term error is being carried forward. This operation is carried out by the multiplexer passing the output of the modifying logic 410 for storage in the frame store 320.
- the fed-back pixel could be discarded and the input pixel used in its place.
- the fed-back pixel's validity flag can be forced to an "invalid" state. This ensures that the next input pixel will overwrite the fed-back pixel.

If the validity flag associated with the newly decoded pixel and the fed-back validity flag are both invalid, then the newly decoded pixel is stored in the frame store.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

In so far as the embodiments of the invention described above are implemented, at least in part, using software-controlled data processing apparatus, it will be appreciated that a computer program providing such software control and a transmission, storage or other medium by which such a computer program is provided are envisaged as aspects of the present invention.

It will be appreciated that the arrangements described with respect to FIGS. 9 to 15 could apply equally to encoding and decoding techniques other than DPCM, for example to discrete cosine transform (DCT) based systems.

We claim:

1. An encoding apparatus operable to encode video data representing successive images, each image having a plurality of pixels, said apparatus comprising:
   a differential encoder arranged to encode each image as one or more predetermined image regions, each image region being encoded as a reference value and at least one differential pixel value, said differential pixel value(s) being derived in dependence on said reference value and/or other differential pixel value(s) in accordance with an order of encoding dependency;
   in which, for each image region, said differential encoder is operable in a first encoding mode for a first subset of said images to encode said image region using a first order of encoding dependency and in a second encoding mode for a second, different, subset of said images to encode said image region using a second, different, order of encoding dependency, and in which said first and second subsets of images are arranged with respect to one another so that, from image to image, each image region is encoded in accordance with a predetermined sequence of orders of encoding dependency, and said predetermined sequence is such that, for each pair of consecutive images, an image region is encoded using different orders of encoding dependency.

2. Apparatus according to claim 1, in which said predetermined sequence is a repeating sequence.

3. Apparatus according to claim 1, in which said first and second subsets comprise complementary sets of alternate images.

4. Apparatus according to claim 1, in which said images are respective fields of an interlaced video signal.

5. Apparatus according to claim 1, in which said reference values in said first encoding mode and said reference values in said second encoding mode respectively represent pixels at different spatial positions within said image regions.

6. Apparatus according to claim 5, in which said reference values in said first encoding mode and said reference values in said second encoding mode respectively represent pixels at substantially opposite peripheral positions within said image regions.

7. Apparatus according to claim 1, in which, within an image region, said order of encoding dependency is defined by a raster scan of said region.

8. Apparatus according to claim 1, in which, within an image region, said order of encoding dependency is defined by an S-type scan of said region.

9. Apparatus according to claim 1, in which, within an image region, said order of encoding dependency is defined by a spiral-type scan of said region.

10. A decoding apparatus operable to decode video signal data representing successive images, each image comprising a plurality of pixels, said apparatus comprising:
    (i) a differential decoder arranged to decode each image as one or more predetermined image regions, each image region being encoded as a reference value and at least one differential pixel value, said differential pixel value(s) being derived in dependence on said reference value and/or other differential pixel value(s) in accordance with an order of encoding dependency, in which, for each image region, said differential decoder is operable in a first decoding mode for a first subset of said images to decode said image region in accordance with a first order of encoding dependency and in a second decoding mode for a second, different, subset of said images to decode the image region in accordance with a second, different, order of encoding dependency;
    (ii) a detector to detect said decoding mode to use for each image region;
    (iii) a second detector to detect whether or not pixels of said decoded image have been validly decoded;
    (iv) concealment logic to derive concealment pixel values from previously decoded pixels to conceal invalidly decoded pixels; and
    (v) logic to apply said concealment pixel values to conceal invalidly decoded pixels.

11. Apparatus according to claim 10, comprising logic to generate concealment pixel values in respect of any image regions or parts of regions not successfully decoded.

12. Apparatus according to claim 11, wherein said concealment pixel values are mean pixel values.

13. Apparatus according to claim 11, wherein said concealment pixel values are previous successfully decoded pixel values.

14. Apparatus according to claim 10, in which said concealment logic comprises logic to detect said temporal separation, with respect to said video signal, between said current image and said image in respect of which said previously decoded pixels were decoded; and in which said applying logic is operable not to apply a concealment value to conceal a current invalidly decoded pixel if said temporal separation is greater than a threshold temporal separation.

15. Apparatus according to claim 10, in which said concealment logic comprises logic to detect whether the previously decoded pixels were validly decoded; and in which said applying logic is operable not to apply a concealment value to replace a current invalidly decoded pixel if said previously decoded pixel(s) used to generate that concealment value were not validly decoded.

16. An encoding method for encoding video data representing successive images, each image comprising a plurality of pixels, said method comprising the steps of: differentially encoding each image as one or more predetermined image regions, each image region being encoded as a reference value and at least one differential pixel value, said differential pixel value(s) being derived in dependence on the reference value and/or other differential pixel value(s) in accordance with an order of encoding dependency; in which, for each image region, a first encoding mode is used for a first subset of said images to encode said image region using a first order of encoding dependency and a second encoding mode is used for a second, different, subset of said images to encode said image region using a second, different, order of encoding dependency, and in which the first and second subsets of images are arranged with respect to one another so that, from image to image, each image region is encoded in accordance with a predetermined sequence of orders of encoding dependency said predetermined sequence is such that, for each pair of consecutive images, an image region is encoded using different orders of encoding dependency.

17. A recording medium including computer program instructions which cause a computer to execute a method according to claim 16.

18. A decoding method for decoding video data representing successive images, each image comprising a plurality of pixels, said method comprising the steps of:
  (i) differentially decoding each image as one or more predetermined image regions, each image region being encoded as a reference value and at least one differential pixel value, said differential pixel value(s) being derived in dependence on said reference value and/or other differential pixel value(s) in accordance with an order of encoding dependency, in which, for each image region, a first decoding mode is used for a first subset of the images to decode said image region in accordance with a first order of encoding dependency and a second decoding mode is used for a second, different, subset of said images to decode said image region in accordance with a second, different, order of encoding dependency;
  (ii) detecting said decoding mode to use for each image region;
  (iii) detecting whether or not pixels of said decoded image have been validly decoded;
  (iv) deriving concealment pixel values from previously decoded pixels to conceal invalidly decoded pixels; and
  (v) applying said concealment pixel values to conceal invalidly decoded pixels.

19. A recording medium including computer program instructions which cause a computer to execute a method according to claim 18.

20. An encoding apparatus operable to encode video data representing successive images, each image comprising a plurality of pixels, said apparatus comprising:
  a differential encoder arranged to encode each image as one or more predetermined image regions, each image region being encoded as a reference value and at least one differential pixel value, said differential pixel value(s) being derived in dependence on said reference value and/or other differential pixel value(s) in accordance with an order of encoding dependency;
  in which, for each image region, said differential encoder is operable in a first encoding mode for a first subset of said images to encode said image region using a first order of encoding dependency and in a second encoding mode for a second, different, subset of said images to encode said image region using a second, different, order of encoding dependency, and in which said first and second subsets of images are arranged with respect to one another so that, from image to image, each image region is encoded in accordance with a predetermined sequence of orders of encoding dependency,
  in which said reference values in said first encoding mode and said reference values in said second encoding mode respectively represent pixels at different spatial positions within said image regions, and
  in which said reference values in said first encoding mode and said reference values in said second encoding mode respectively represent pixels at substantially opposite peripheral positions within said image regions.

* * * * *